US006305625B1

(12) United States Patent
Talamantez, Sr. et al.

(10) Patent No.: US 6,305,625 B1
(45) Date of Patent: Oct. 23, 2001

(54) REFUSE COLLECTING AND DISPOSAL HANDLING (TEAM II USA)

(76) Inventors: Rudolph Talamantez, Sr., P.O. Box 204, Aberdeen, MD (US) 21001; Rudolph Talamantez, Jr., 103 providence Pl., Willow Street, PA (US) 17584

( * ) Notice: Subject to any disclaimer, the term of this patent is extended or adjusted under 35 U.S.C. 154(b) by 0 days.

(21) Appl. No.: 09/457,152

(22) Filed: Dec. 8, 1999

Related U.S. Application Data

(60) Provisional application No. 60/118,688, filed on Feb. 2, 1999.

(51) Int. Cl.[7] ..................................................... A01D 34/00

(52) U.S. Cl. ................................ 241/101.71; 241/101.2; 241/285.1; 241/DIG. 38

(58) Field of Search ............................ 241/101.71, 101.2, 241/285.1, DIG. 38; 53/527, 529, 567; 100/100

(56) References Cited

U.S. PATENT DOCUMENTS 5,395,061 * 3/1995 Merklinger ...................... 241/101.71
5,465,914 * 11/1995 Faccia ............................ 241/101.71
5,784,865 * 7/1998 Cullen .................................. 53/567

* cited by examiner

*Primary Examiner*—Allen Ostrager
*Assistant Examiner*—William Hong

(57) ABSTRACT

A refuse collecting and disposal handling vehicle know as TEAM II USA™ is basically two vehicles working together in a tandem. The parent vehicle is arranged and configured to properly lift and empty a front-loading refuse container. The companion vehicle (The Accumulator) is arranged and configured in a trailer mode. The parent vehicle that tows the Accumulator is further arranged internally with a mutilating device which will, upon demand, process the bulk refuse received and converts it into many bits and small pieces, chips and saw dust. These bits and pieces are allowed to drop into a strong wind stream, which will transfer the bits and pieces into the Accumulator via a transition wind tunnel. Once the bits and pieces enter into the Accumulator a secondary strong wind source further pushes the flowing bits and pieces whirling them around into a collection chamber, where yet another strong high velocity wind source is applied and permits the flowing materials to whirl around a back pressure platen device. Then the materials being blown and sucked under a strong high velocity wind pressure will arrange themselves occupying all available space to form a neat packed and compacted refuse bale automatically, much like materials being sucked up by a household vacuum cleaner. Once the Accumulator is filled to capacity, it may then be uncoupled from its towing companion vehicle and parked aside for further servicing. With very little waste of time, the Accumulator is rehitched to a more economical towing vehicle, allowing the parent vehicle to continue servicing the route. The Accumulator is then towed to the landfill and returns empty for reuse.

20 Claims, 14 Drawing Sheets

Figure 1:
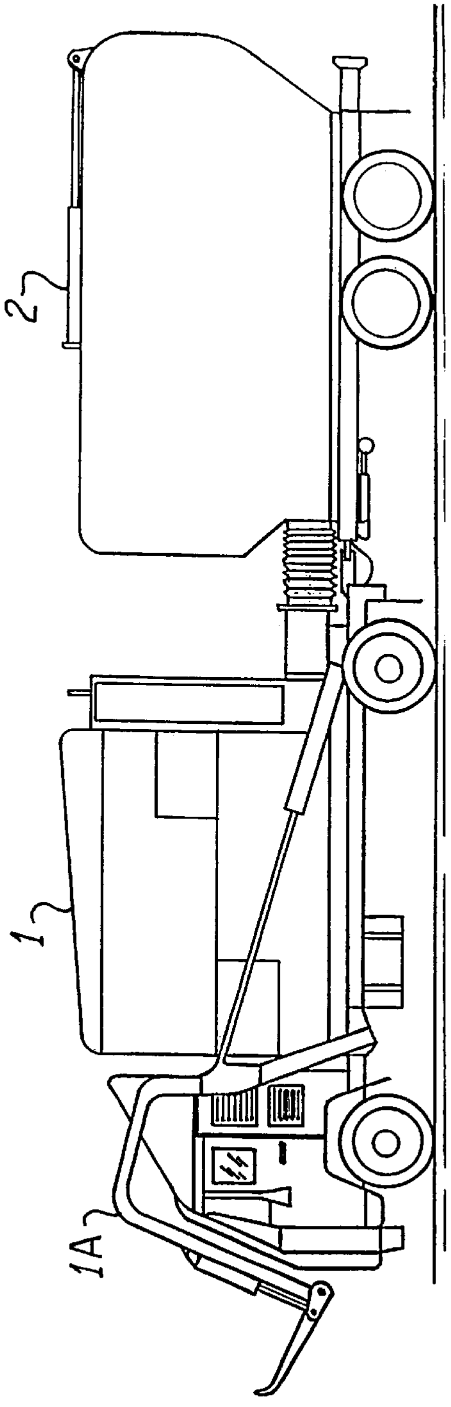

FIGURE 6
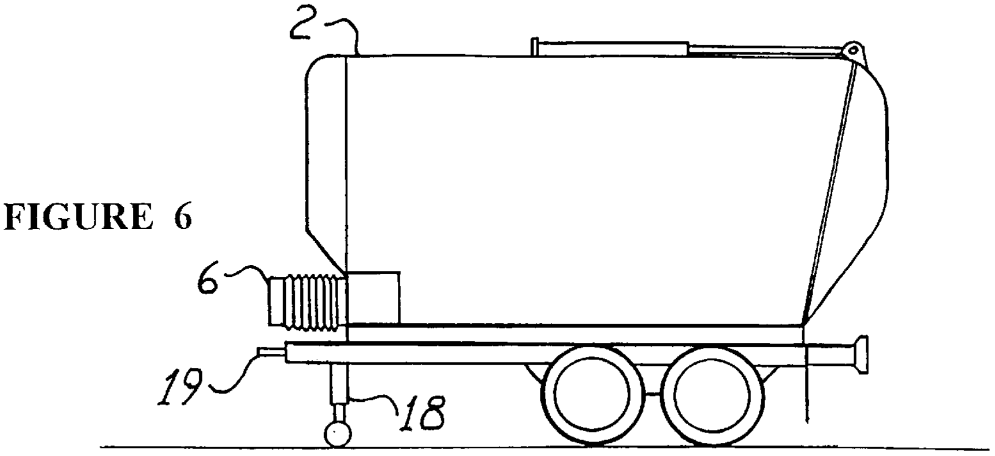
FIGURE 6A
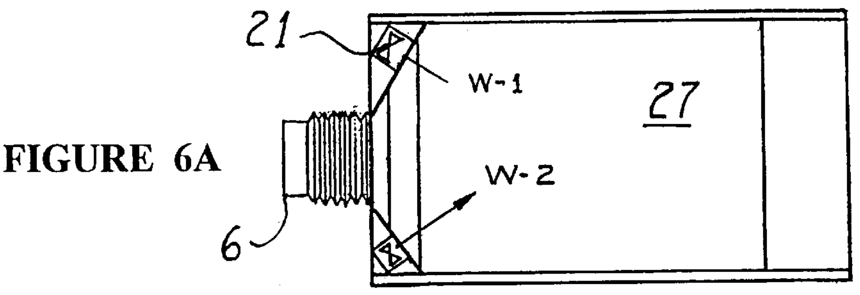
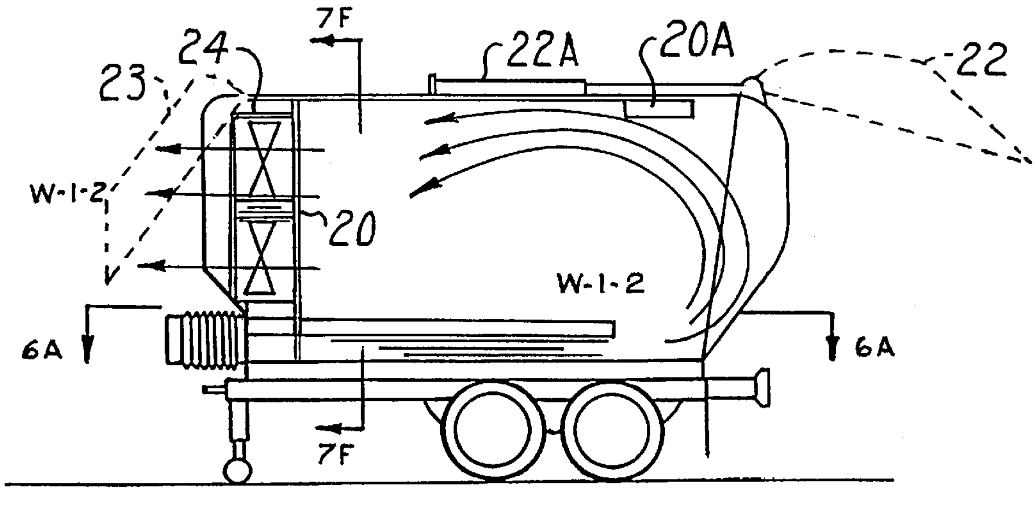
FIGURE 7

FIGURE 9
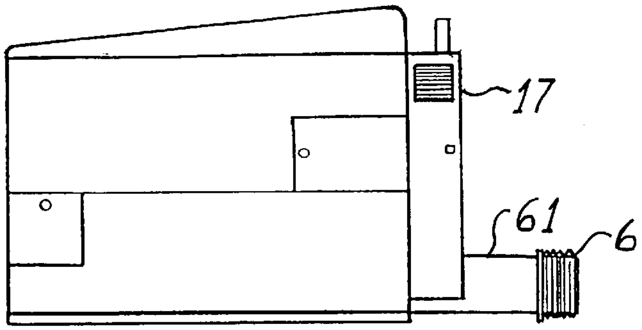
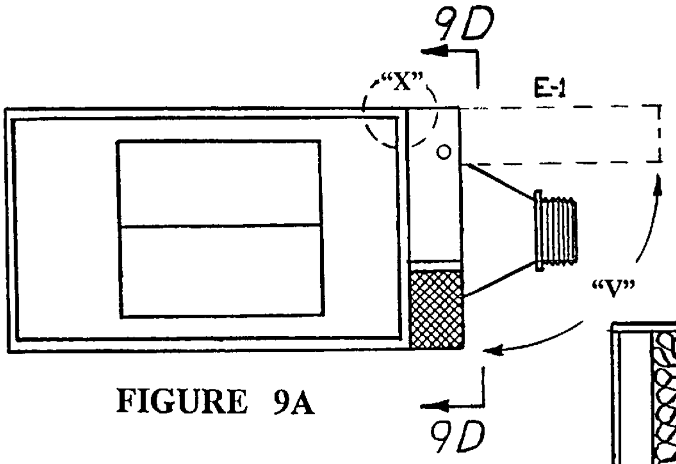
FIGURE 9A
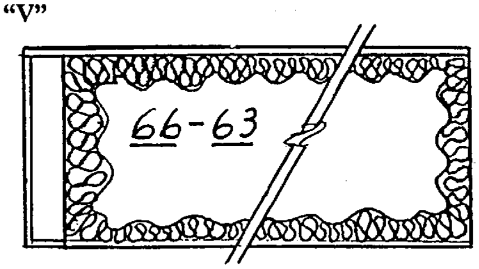
FIGURE 9C
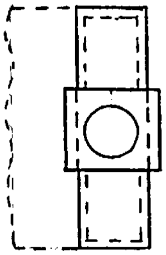
FIGURE 9B
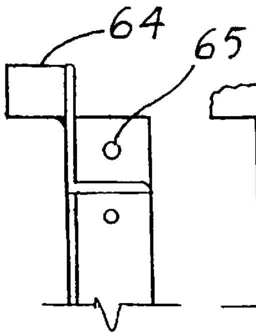
FIGURE 9E
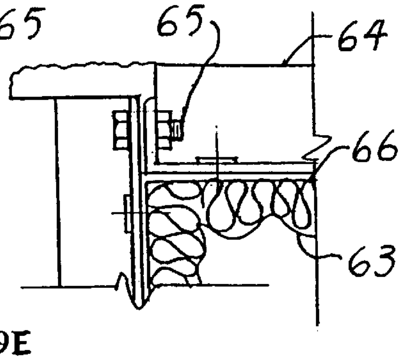
FIGURE 9D

REFUSE COLLECTING AND DISPOSAL HANDLING (TEAM II USA)

This application claims benefit of Prov. No. 60/118,688 filed Feb. 2, 1999.

TEAM II USA™ is basically two vehicles working together in a tandem. The parent vehicle is arranged and configured to properly lift and empty a front-loading refuse container, as in the present art. The companion vehicle (The Accumulator) is arranged and configured in a trailer mode.

The parent vehicle that tows the said Accumulator is further arranged internally with a Mutilating device which will, upon demand, process the bulk refuse received and convert it into many bits, small pieces, chips and saw dust. These said bits and pieces are allowed to drop into a strong wind stream, which will transfer the said bits and pieces into the trailer (Accumulator) via a transition wind tunnel. Once the said bits and pieces enter into the Accumulator a secondary strong wind source further pushes the flowing said bits and pieces whirling them around into a collection chamber, where yet another strong high velocity wind source is applied and permits the flowing materials to whirl around a back pressure platen device. Then the materials being blown and sucked under a strong high velocity wind pressure will arrange themselves occupying all available spaces to form a neat packed and compacted refuse bale automatically, much like materials which are sucked up by a normal household vacuum cleaner. Once the said Accumulator is filled to capacity, it may then be uncoupled from its towing companion vehicle and parked aside for further servicing.

The said Accumulator trailer is coupled/hitched to a more economically operated vehicle, and it is dispatched to the landfill. There it is emptied of its contents, washed/rinsed and made ready for reuse. The empty said Accumulator is returned and parked at a predetermined location, where its original companion vehicle will be re-hitched for reuse and continue the assigned refuse collection route with very little lose of time. It is obvious to note that this operation will require a front-loading configured towing vehicle, two or more Accumulator trailers and a lesser size vehicle for servicing the filled refuse Accumulator trailer. It will be a matter of routine operation that will become apparent that the operation of this collection and disposal handling system will require several levels of skilled vehicle operators. One operator for the front-loading vehicle whose duties require more training and skill, while the lesser size vehicle operator requires very little, if any, additional training other than that of learning to back up an ordinary boat trailer or any utility trailer, which is normal and standard in the art. As the operation of these vehicles becomes more in use, the smoother the transfer of vehicles becomes, which will now contribute to an economical advantage over the present art. In the present art, many heavy duty vehicles which are in use daily become an economic disadvantage, where the skilled operators of these vehicles have to be dispatched to the landfill, wasting time and operating resources due to the necessary construction which requires heavy duty reinforced steel structures. This then contributes to the heavy weight that must be carried around to the landfill. It is also obvious to note that the bigger the vehicle, the bigger the tires. Also of note, the bigger the vehicle the more fuel it consumes. Once the vehicle becomes emptied it must be washed/rinsed and made ready for reuse. Further, due to its basic construction, many dependent parts have to be inspected and repaired or replaced in order to make the vehicle ready for reuse.

TEAM II USA™ offers an economical method for the construction of, the maintenance of, and the overall operating economy over the present art.

First, lighter construction materials are used. The construction requires that each vehicle's refuse collection chambers be constructed with removable panels that may be readily mass-produced. Thus creating an economical advantage over the heavy duty welded panel and reinforcements as it is in the present art, which require more manual labor operations.'

Secondly, the use of a Mutilator device means for use in the treatment of the refuse, becomes more of an economical advantage due to the rotary features of the Mutilator which by tradition requires less maintenance over the standard art's hydraulic system. The said hydraulic system requires constant inspections and maintenance services, which become necessary for daily operational needs.

Thirdly, the use of a standard chassis, i.e. same width, height, and length as prescribed in TEAM II USA™, provides for less vehicle inventory, which will contribute to the overall economy. Different size and weight differentials require the large size spare parts warehouse operation, which is required as in the present art. This then will add a financial burden to the overall operation.

Fourthly, since TEAM II USA™ provides a secondary treatment of the collected refuse where it becomes torn in tiny bits, pieces and saw dust, this becomes a landfill advantage over the present art, since the said bits and pieces are able to become buried more easily than chunks of compacted refuse as in the present art. This requires heavy and expensive landfill operations machines.

Many other advantageous features and economical advantages will become apparent over the present art as this invention is further examined.

BACKGROUND OF THE INVENTION

This invention relates in general practice with a refuse collection vehicle of the kind that is generally known in the present art as a front refuse loading vehicle. Basically the said front-loading vehicle comprises of a front-loading forklift, which is capable of lifting and emptying a refuse container. The material is gathered in a compaction chamber where heavy duty hydraulic cylinders compact the refuse and increase its density, i.e. 4-1, 6-1 or 10-1. The employment of these vehicles provides an effective method for the collections of refuse et al. However, in order to accomplish said effective method, the vehicles have to be manufactured with heavy reinforced structures in order to withstand the internal pressures associated with the compaction treatment of the collected refuse. So it becomes apparent that with the stronger, denser compaction, heavier reinforcements are required, hence an economical factor is derived based on the amount of density requirements for collection routes. This operation often becomes an expensive commodity, yet a necessary item for our modern way of living.

The difficulties with the present art may be alleviated and by employing a revolutionary refuse collecting system with a trade name, TEAM II USA™ employs two vehicles. One vehicle lifts and empties is used for towing and the other gathers the materials (Accumulates), hence Accumulator which is configured in a trailer mode.

The towing vehicle is further comprised with a mutilating device, which upon demand will process the gathered refuse and converts it into the bits, pieces and sawdust. This processed refuse can now be conveyed by means of a strong high velocity wind, which is directed via transitional parts into the Accumulator trailer. There it is gathered and sucked into a neatly formed refuse bale, under a pulling, sucking wind pressure much like the vacuum pressure as in any modern household vacuum cleaner. When the Accumulator becomes full to capacity it may be uncoupled and parked aside at a predetermined place where a companion, less expensive mode of transportation will provide towing services to the landfill. The Accumulator is further disposed with an automatically operated tailgate system which allows the collected processed refuse to be discharged/dumped at the landfill. Once the refuse materials are completely emptied, the Accumulator is, upon demand, washed, rinsed and made ready for reuse, with little or no additional labor effort requirements. The runoff residuals remain within the confines of the landfill area. The Accumulator is further arranged with a moveable platen device, which will be automatically positioned to assist in the accumulation of the processed refuse. The platen device is arranged with a plurality of high velocity wind mover fans/blowers, which provide the wind flowing media, allowing the processed refuse to seek a compaction form. Hence providing a neatly compacted refuse bale. The access wind is allowed to exhaust through a series of filters, which will minimize the amount of air polluting dust particles to escape into the environment.

SUMMARY OF THE INVENTION

TEAM II USA™ is herein presented to address and to correct various malfunctions which effect the waste collection industry et al.

First, in the present standard art due to the nature of the construction of the refuse collecting vehicles and the method used in the treatment of the collected refuse, it becomes necessary to employ heavy duty hydraulic cylinders. These provide the heavy pressure necessary to create very high densely packed refuse bales. These internally applied hydraulic pressures necessitate by design that the compaction enclosures be reinforced with heavy duty steel structures. This then becomes one of the most expensive elements and contributes greatly to the cost of refuse collection vehicles. In order to alleviate this economical malfunction, we present here TEAM II USA™.

Because the necessity to compact the collected refuse by hydraulic means is not necessary, the TEAM II USA™ provides an economical advantage whereby the construction of the collection cubicles (enclosure) are manufactured out of lighter sheet steel, which by design may be mass produced. Each cubicle (enclosure) remains constant dimensionally. Yet other advantages are advanced when a production run remains constant with very little or no modifications. In the present art, because of the capacity factor, this is difficult to arrange. Many models are offered in order to justify the capacity needs. On the other hand, TEAM II USA™ resolves this difficulty by providing a standard size collection capacity vehicle, which remains constant regardless of the capacity requirement. Therefore, an economical advantage is offered over the present art. This is accomplished with the use of a mutilating device, which is disposed within the collection enclosure. The treatment of the collected/gathered refuse resides in the conversion of said refuse into many small bits, pieces, chips and sawdust. Further, because there is no need to forcibly compact the refuse under hydraulic pressures, the material gathered is compacted with the forces of gravity and a strong high velocity wind that, by design, eliminates need for heavy reinforcements of the collection enclosure. Hence, an economical advantage is derived. In addition, because the refuse now being handled becomes very manageable under a steady strong high velocity wind stream that, by design, is directed from the collection enclosure into the Accumulator trailer, the handling of the refuse in this manner provides additional economic advantages. Whereby the Accumulator requires smaller tires and requires less maintenance, it is self-cleaning (washing/rinsing) thus providing labor saving that will contribute financial savings to the overall operation activity.

Another financial gain is derived from the mass production of panel parts, which can by design be shipped in large quantities for its final intended use. The collection enclosure (Mutilator) may be prefabricated at one location and shipped, knocked down and warehoused for later use and may be sold as part of a franchising arrangement providing another financial benefit.

Yet another financial benefit is derived when any of the working vehicle's panels become damaged. In the present art, repairs are costly. Where by TEAM II USA™ provides remedial arrangements by simply removing the removable damaged panel and a replacement panel may be installed with little wasted effort. Still of further interest, the removable panels are insulated with fire retarding materials, which will minimize fire damage contributing to lower insurance fees. An additional financial insurance savings is derived from the built in fire extinguishing system. Automatically set off fire alarms are built in the system setting off a water sprinkling organism to minimize fire damage.

A further financial gain is derived from a self-cleaning washing/rinsing built in system that eliminates hand washing operations. Of further notice, while self-washing/rinsing and self-extinguishing fire retarding materials are not new per say, however, the introduction into the refuse handling industry et al is a new novelty. Also, removable and replaceable panels used in the construction of refuse enclosures heretofore have never before been introduced. It is also note worthy that the replaceable panels may be optionally constructed out of fiberglass or composite materials. The enclosure may also be molded out of plastic materials, eliminating need for removable panels. Thus providing an added financial gain.

The introduction of TEAM II USA™ represents a revolutionary method for the handling of a refuse collection and disposal system in its most simplified form. It is of interest to note that many other models, revisions and improvements will in a matter of time become apparent to all those who are keen in the art. Therefore, herein this application we address various models, which may be of interest. Presented here are models associated with a front loading operation, rear loading operation and side loading operation. The inclusions of automated handling devices will be obvious to all those who are keen in the art.

In the most simplified form we present the following:

2 models of front loading systems
2 models of rear loading systems
1 model of side loading system
1 model of a transfer system
1 model of land clearing system

BRIEF DESCRIPTION OF THE DRAWINGS AND A DETAILED DESCRIPTION OF THE INVENTION

To better understand this invention, refer to the figures herein enclosed outlining pertinent parts in numerical elements.

FIG. 1 reveals a side elevation view of the normally operated pair of vehicles working in tandem as a team (TEAM II USA™). A refuse collection enclosure/collection chamber 1 serves to hold the collected refuse materials. 1-A reveals the normal fork lifting system. 2 reveals the Accumulator/trailer where the collected and processed refuse materials are neatly compacted into a refuse bale.

Figure 2:
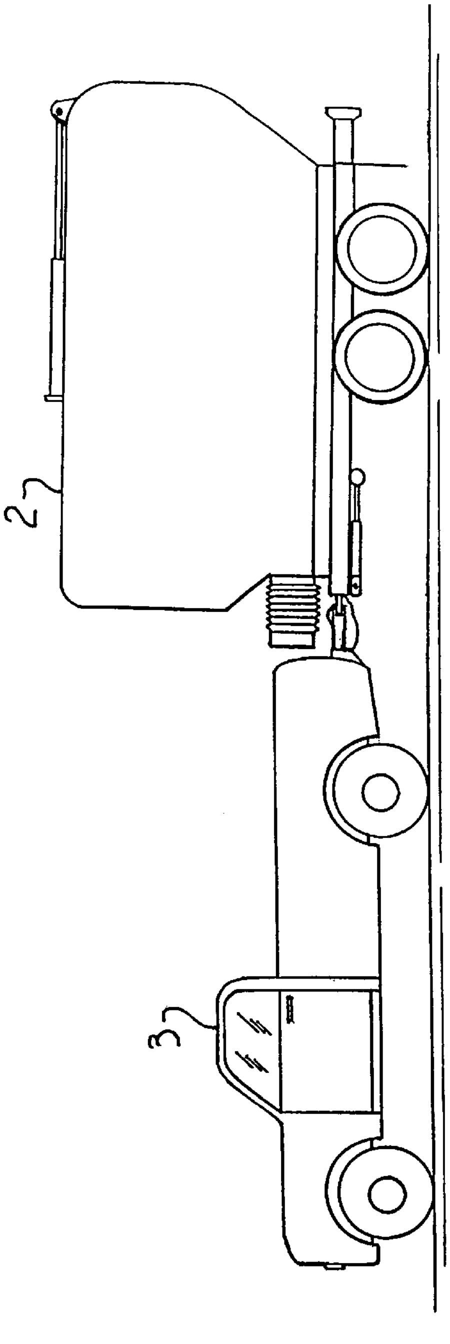

FIG. 2 reveals a side elevation view of a normally operated Accumulator trailer 2, which is being towed to the landfill by a more economical towing vehicle 3. Once the refuse contents have been dumped, the emptied Accumulator/trailer is made ready for reuse.

Figure 3:
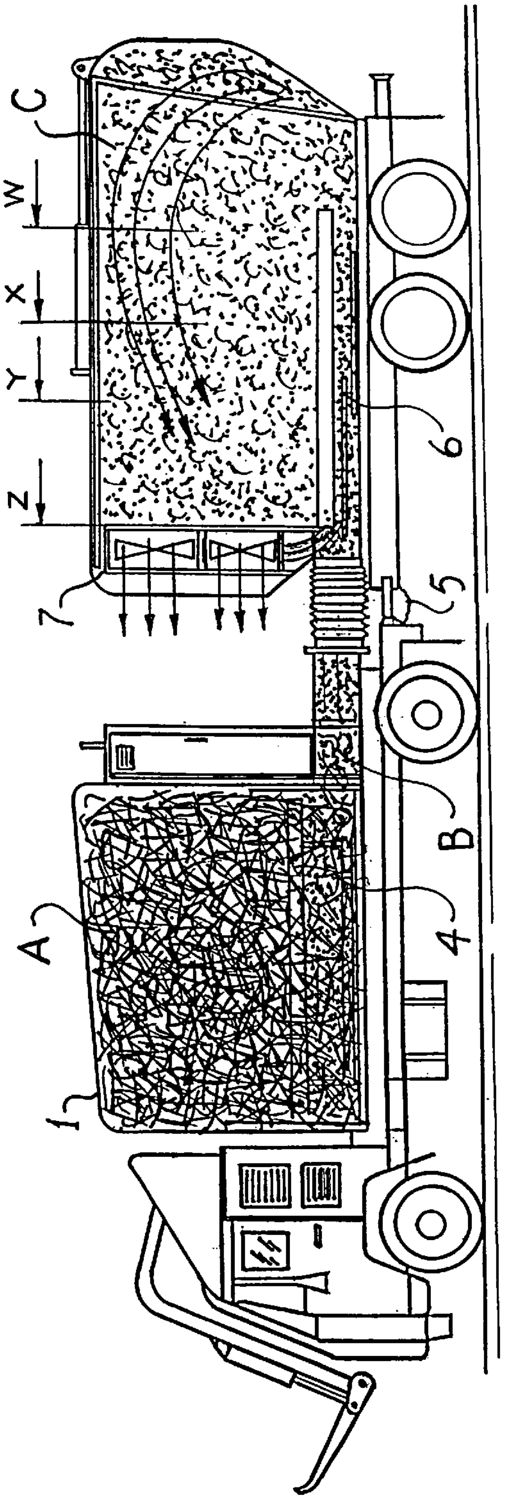

FIG. 3 reveals an internal cross sectional side view (TEAM II USA™) demonstrating the systematic handling of the processed refuse. The bulk collected material represented by A is by demand processed into tiny bits, chunks, chips and saw dust by a Mutilator device 4. The said Mutilator device is comprised of a series of high speed traveling chain saws, i.e., FIG. 11, 12, 13, and 14, items 76 and 77. These high speed saws will tear into the collected bulk refuse materials virtually destroying its composition thus creating an avenue of flying debris, virtually composing a steady stream of fast flying objects, which are now being transported by a very strong wind, represented by B. This is directed to the Accumulator 2 via wind tunnel 5 and 6. These bits and small particles are identified by C, and are then backed into a platen device 7 that is positioned at W. As the Accumulator begins to fill up, the said platen 7 will automatically move to a new position X, Y, Z affording additional room for the automatic loading of the Accumulator 3. When the platen device moves to the position Z, a full bin indicator (3A) will alarm and warn the operator that the Accumulator is now filled to capacity.

Figure 4B:
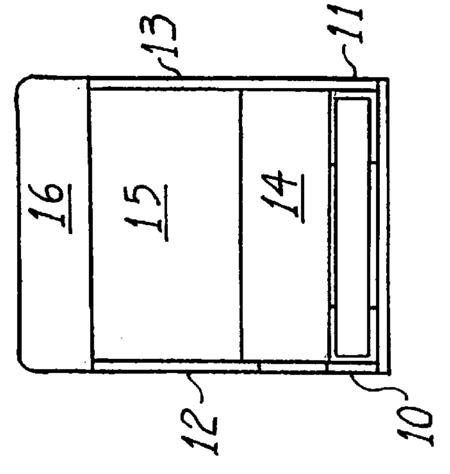
Figure 4A:
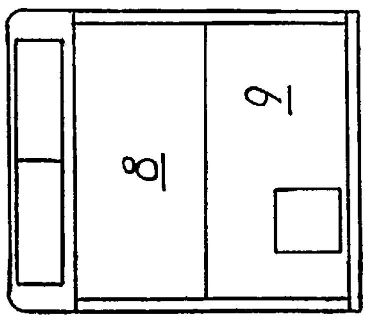
Figure 4:
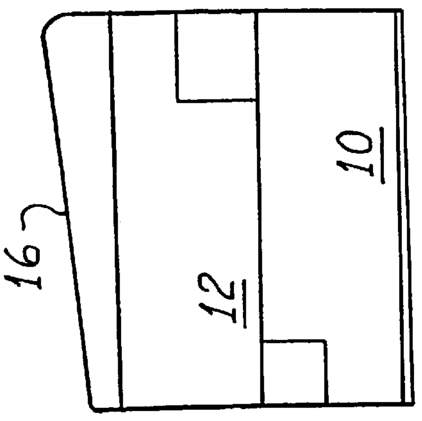
Figure 7A:
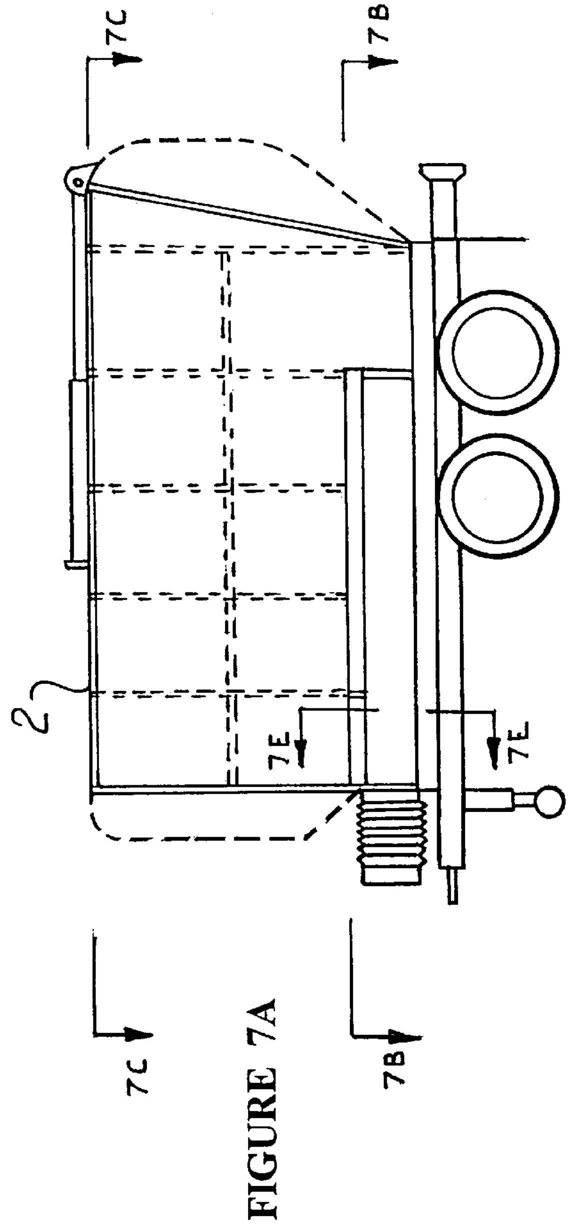
Figure 7B:
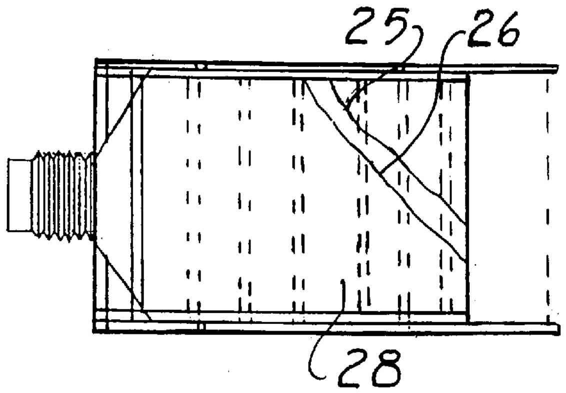
Figure 7C:
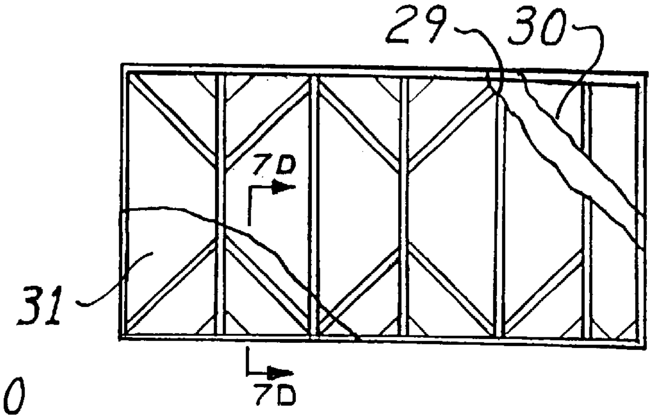
Figure 7D:
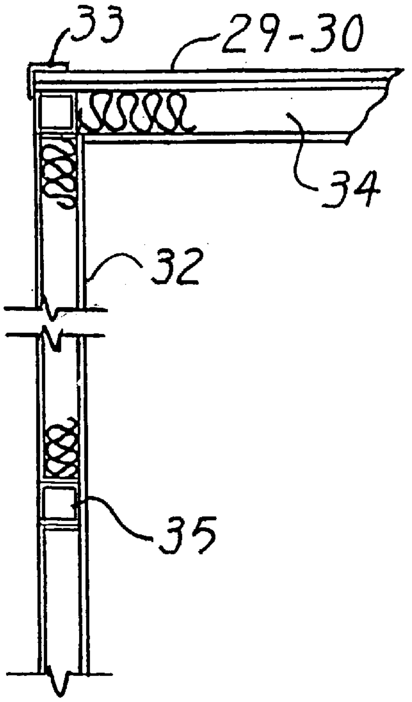
Figure 7E:
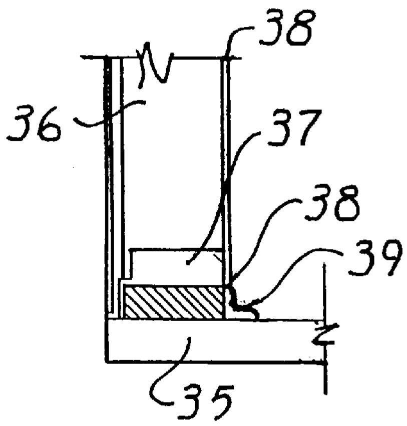
Figure 7G:
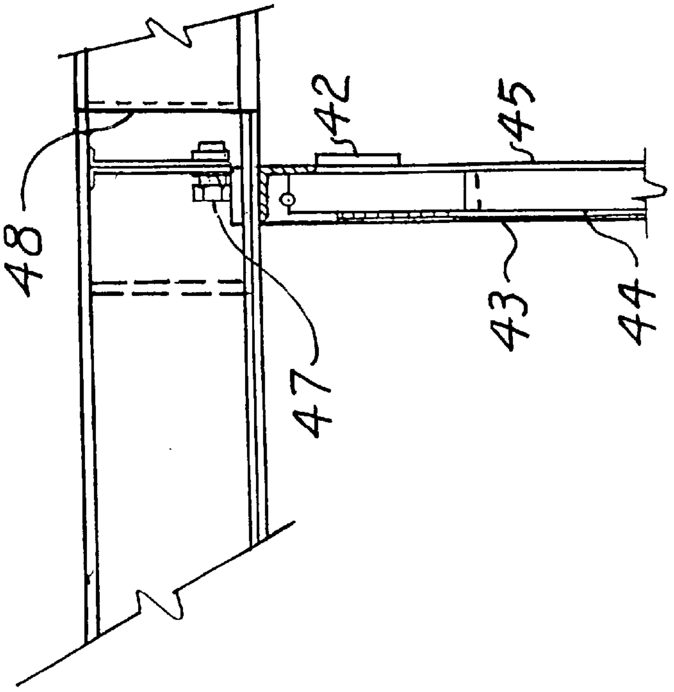
Figure 7F:
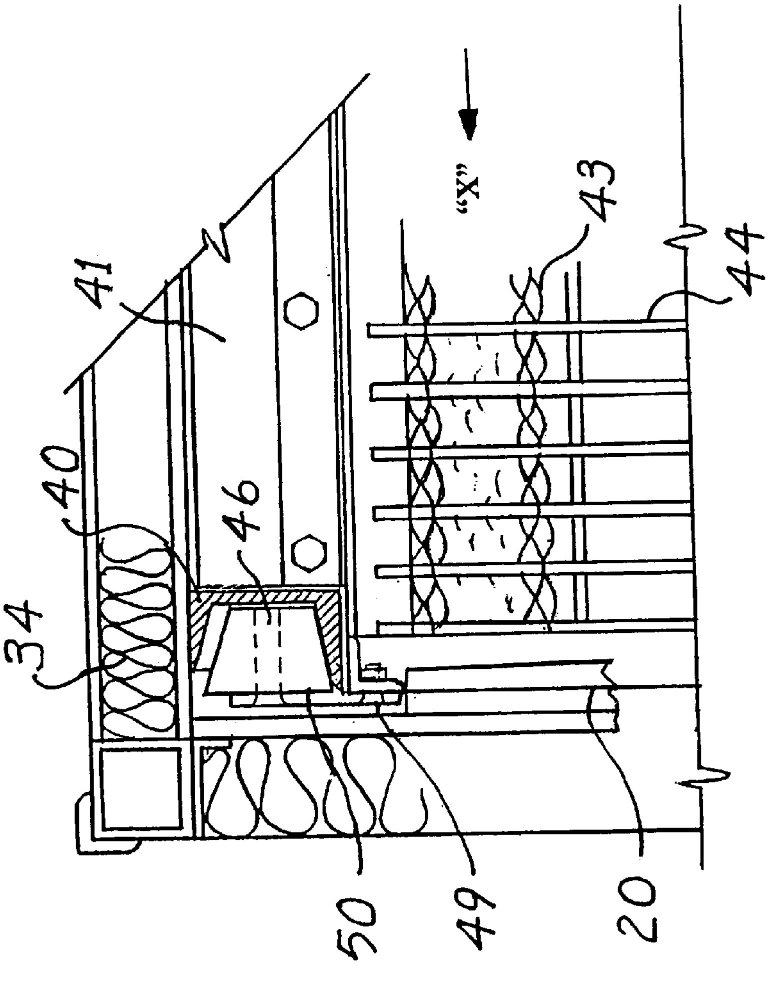

FIG. 4 reveals an external side view of the collection enclosure cubicle demonstrating the arrangement of the removable panels (8, 9, 10, 11, 12, 13, 14, 15 and 16).

FIG. 4A reveals an external front view of the collection enclosure demonstrating the arrangement of the removable panels (8 and 9).

FIG. 4B reveals an external back view of the collection enclosure demonstrating the arrangement of the removable panels (10, 11, 12, 13, 14, 15, and 16).

Figure 5:
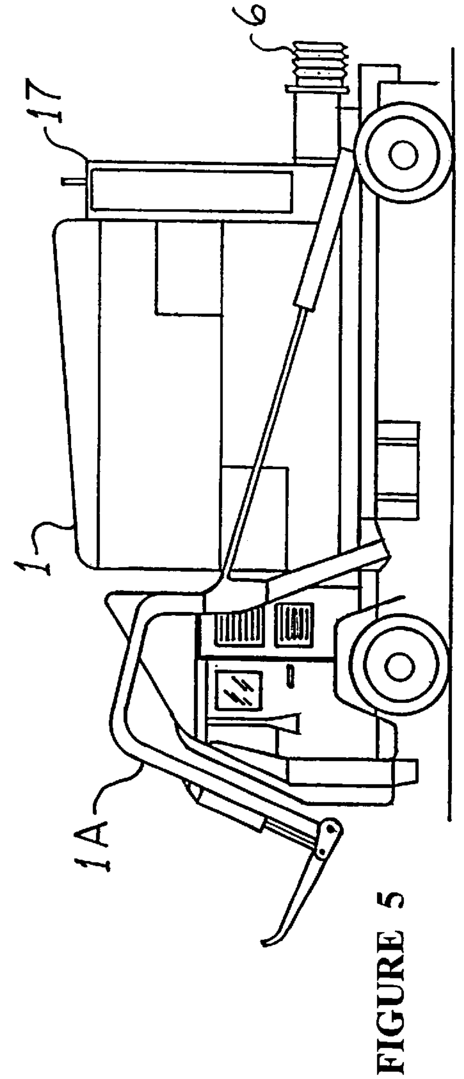

FIG. 5 reveals an external side elevation, demonstrating the composition of the collection enclosure cubicle, as it would appear ready for work. 1A shows the lifting forks, 1 is the complete collection cubicle, 17 is the power supply cubicle, 6 represents the flexible connector, and 6A represents a transition part.

FIG. 6 reveals an external side view arrangement of the Accumulator Trailer 2; 6 is a companion flexible connector; 18 illustrates stand alone parking legs; 19 represents the hitching system.

FIG. 7 reveals an internal side elevation view demonstrating the paths taken by the high velocity wind blower 24W, W2. The arrangement of the wind blowers is further demonstrated at FIG. 6A which reveals a top internal view, also showing the Accumulator flooring 27. FIG. 7A reveals the internal construction features of the Accumulator 2, reference not FIG. 7B which is atop internal view of the wind passage tunnel; 28 represents a moisture barrier; 25 is the sub flooring liner; 26 is the floor covering. FIG. 7C reveals an external top view of the roof 31; 29 represents a sub roofing weather proofing cover; 30 represents the roofing cover materials. FIG. 7E reveals a partial lower internal floor construction feature; 36 are flooring joist; 37 flooring joist mounting bracket; 39 flooring joist fasteners; 35 Accumulator framing. FIG. 7D reveals the Accumulator wall construction features; 35 skeletal framing; 32 internal lining; 34 fire retarding insulation; 33 top roof moulding. FIG. 7F is an internal front view of the platen device 20 and 24; platen track system 40, 41 and 42 represents an internal dust removing system wiper; 43 reveals an elongated metal barrier; 44 reveals a pressure back up means; 45 represents the platen 20 framing; 46 carriage wheels; 47 top carriage platen fasteners; 48 is the platen positioning limit; 49 lower platen carriage mounting fasteners; 50 upper platen carriage fasteners. FIG. 7G reveals side elevation view of the platen device 20.

Figure 8C:
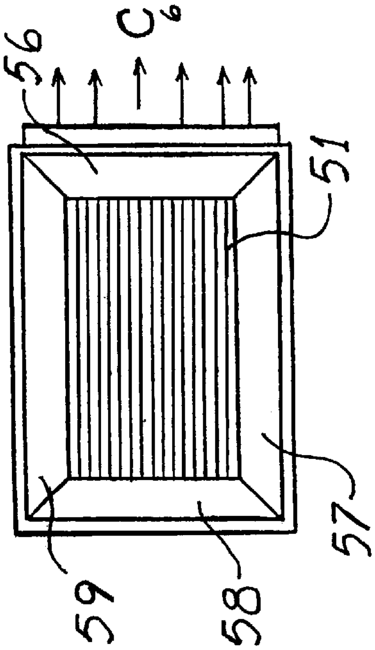
Figure 8B:
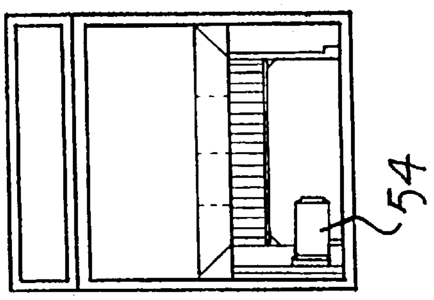
Figure 8:
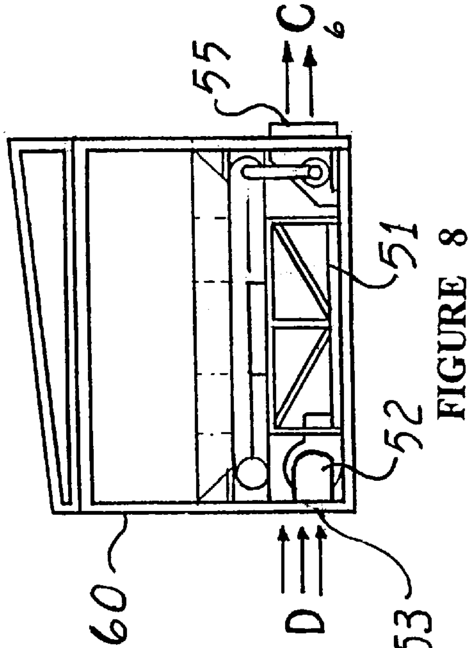
Figure 8A:
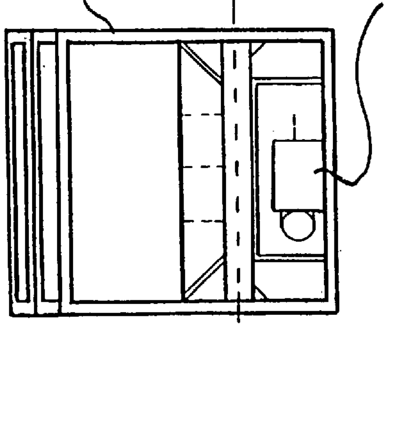

FIG. 8 reveals an internal side elevation view, demonstrating the positioning of the Mutilator device 51; 52 reveals a high velocity wind blower; 53 represents the air intake; 54 represents the Mutilator drive system; 55 (D) represents the wind exhaust; (C6) 56, 57, 58, and 59 are refuse gathering direction slides (chutes); 60 reveals the skeletal framing. FIG. 8A reveals an internal front view of the Mutilator device. FIG. 8B reveals an internal rear view of the Mutilator device. FIG. 8C reveals an internal top view of the Mutilator device.

FIG. 9 reveals an external side elevation view of the refuse collection enclosure, demonstrating its companion elements; 17 is a power supply cubicle; 61 reveals a transition device. FIG. 9A reveals an external top view demonstrating the swing away feature "V" which is required for the servicing of the Mutilator; E-1 represents the extent of the swing "V." FIG. 9B reveals an external front view of the transition 61. FIG. 9C demonstrates the internal construction features of the transition 61; 63 represents insulation; 66 represents corrugated panels; 64 external framing; 65 fasteners; FIG. 9C is the front view of FIG. 9; FIG. 9D is exploded view of Det. "X". FIG. 9E is the side view of FIG. 9D.

Figure 10:
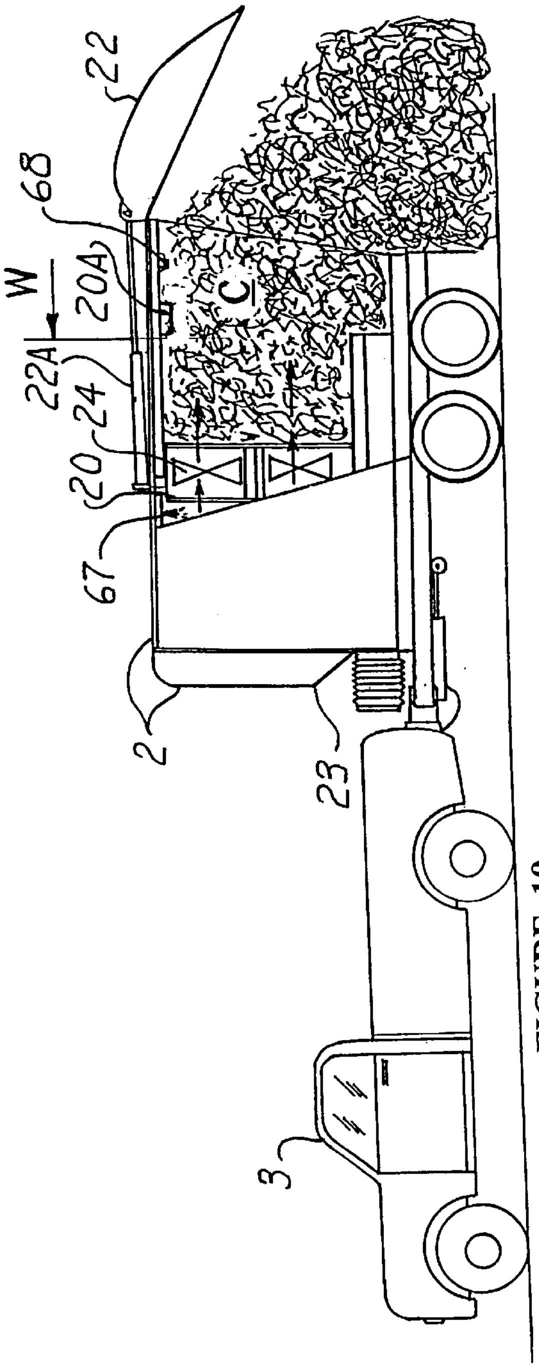

FIG. 10 reveals a composite view partially internally disclosed demonstrating the methodology employed to discharge the accumulated refuse C; 3 is the towing vehicle; 2 is the Accumulator trailer; 20 represents the mobile platen device; 20A is the platen drive system; 22 is the automatically operated tailgate; 22-A is the tailgate operating system; 24 shows high velocity wind blowers; 23 represents the front cap enclosure; 67 represents the water sprinkler.

Figure 11:
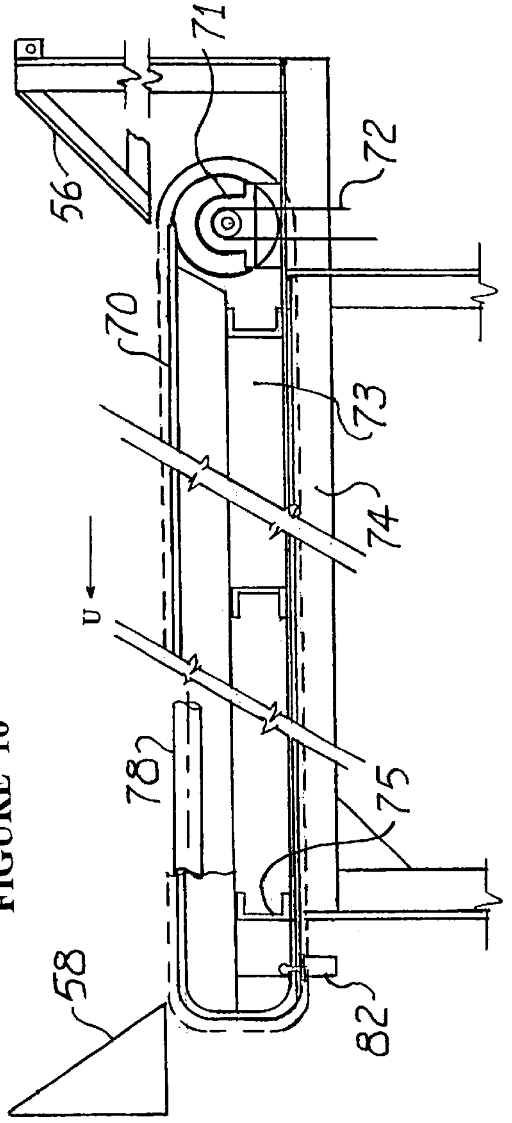

FIG. 11 reveals a side elevation view of the Mutilator Device, items 56, 57, 58 and 59 are slides which direct the refuse into the Mutilator for processing; 70 is a high speed traveling chain saw, which is traveling in the direction "U"; 71 drive mechanism clutch; 72 is the driving mechanism; 73 is an under traveling saw chain support structure; 74 and 75 framing members; 76 is the traveling saw chain teeth; 77 represents the traveling chain sprockets; 78 refuse supporting arms; 79 traveling chain drive shaft; 80 illustrate main support bearings; 81 traveling chain lubrication header; 82 grease reservoir.

Figure 12:
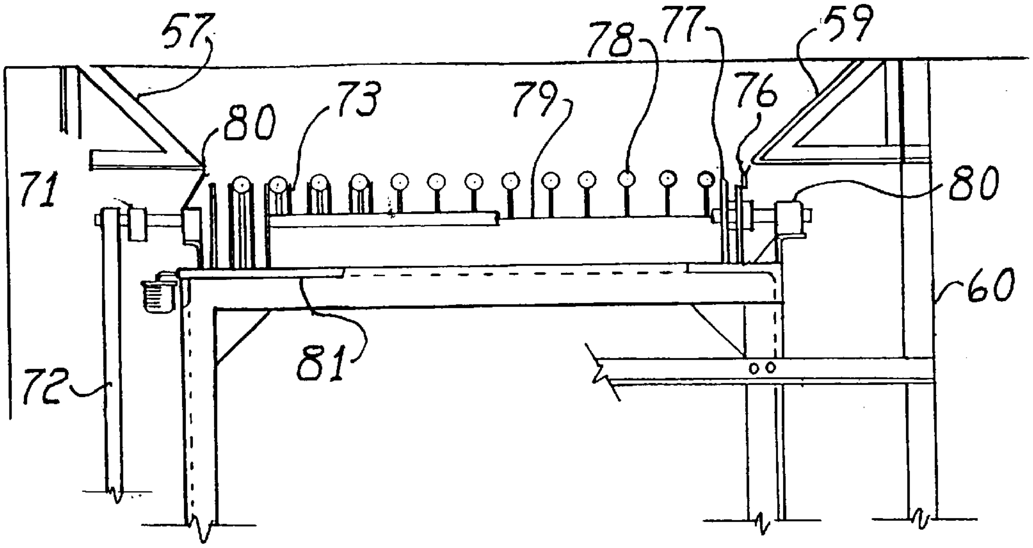

FIG. 12 reveals a front view of the Mutilator Device.

Figure 13:
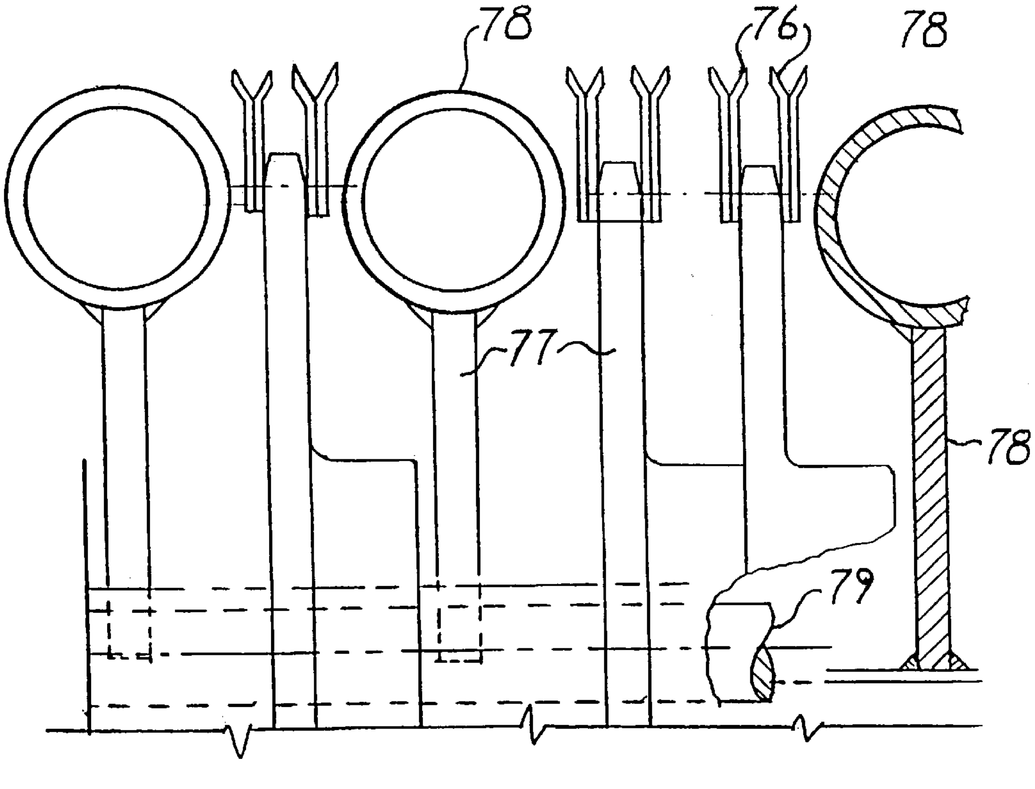

FIG. 13 reveals a partial enlarged front view of the traveling saw chains.

Figure 14:
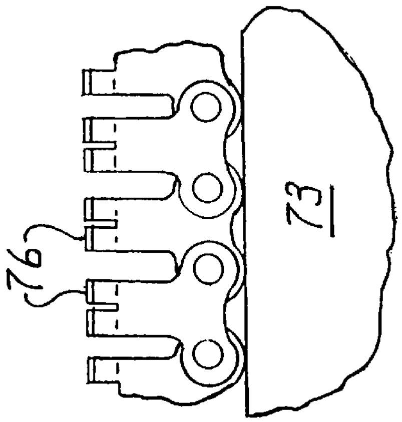

FIG. 14 reveals a segmented part of the traveling chain's 76 cutting teeth.

Figure 15:
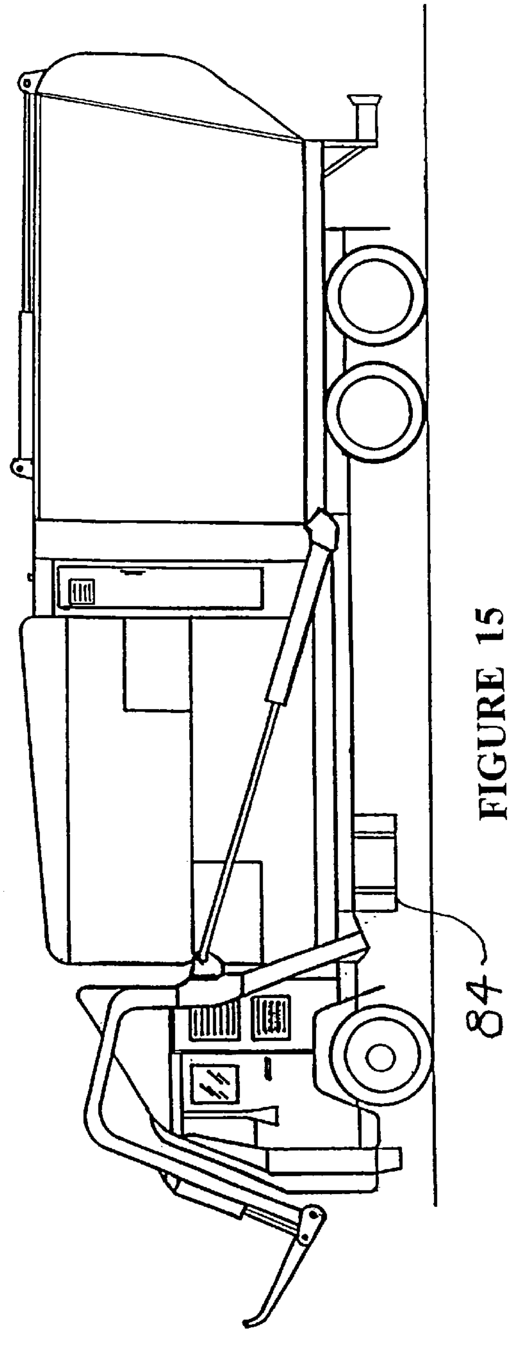

FIG. 15 reveals the second embodiment of the invention; 84 represents a single long chassis; 1 is the collecting enclosure; 2 represents the Accumulator.

Figure 16:
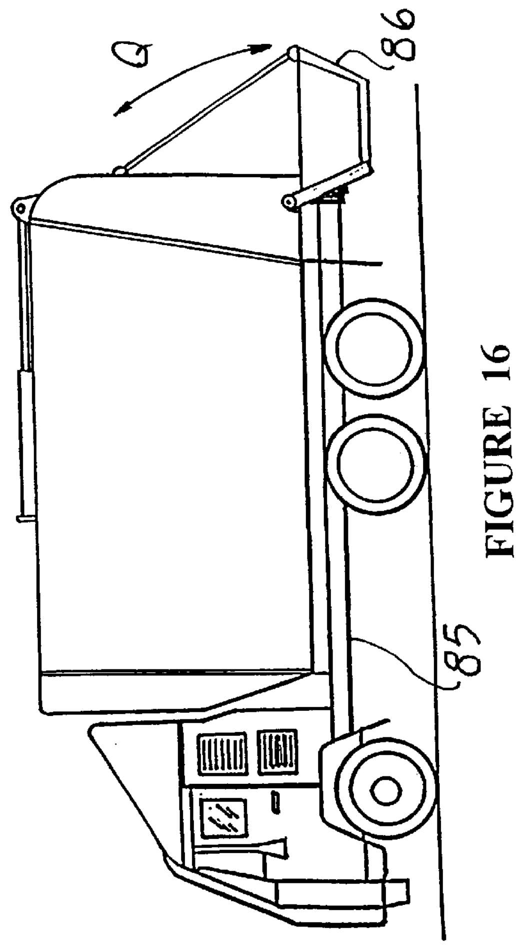

FIG. 16 reveals the third embodiment of the invention; 85 represents yet a different type chassis; 2-B represents a composite collection enclosure and the Mutilator Device, i.e. FIG. 11, in a single mode refuse rear loading hopper (86) which automatically discharges the collected refuse in the processing enclosure along the direction "Q."

Figure 17:
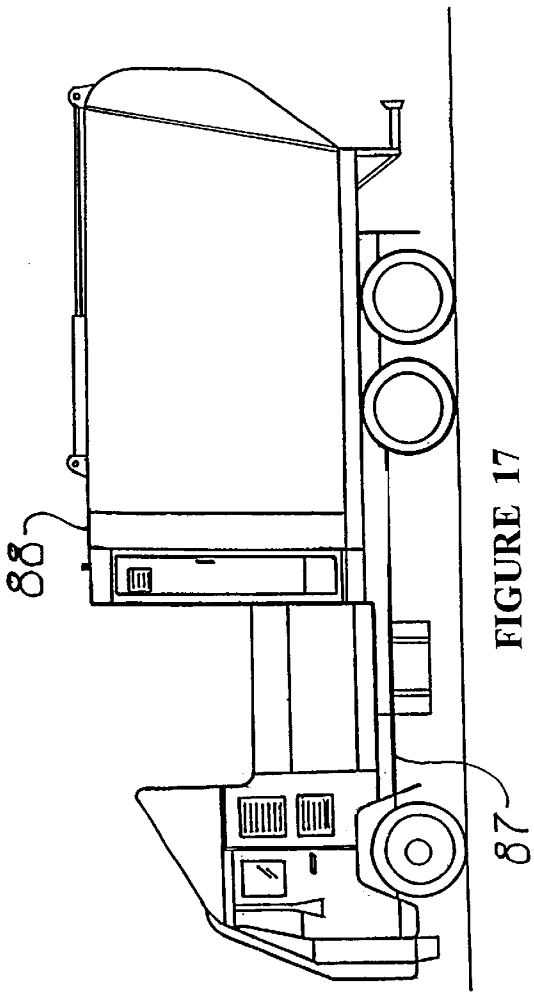

FIG. 17 reveals the fourth embodiment of the invention; 87 represents yet another type of chassis, which is a side loading mode; 88 represents the Side Mutilator configuration and its companion Accumulator.

Figure 18:
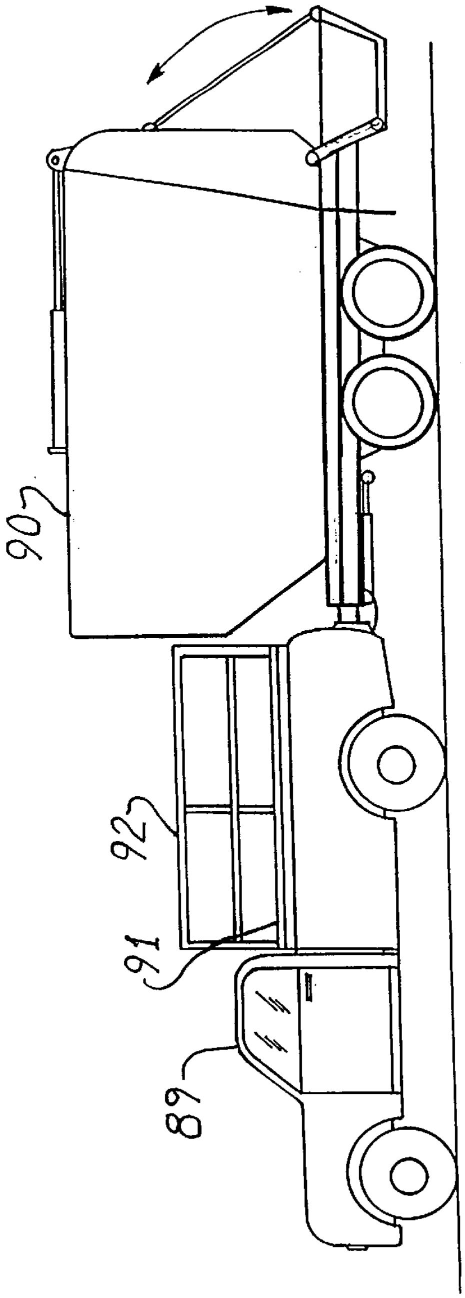

FIG. 18 reveals the fifth embodiment of the invention; 89 represents an additional type of chassis, which is equipped with a dumper; 91 show side guards; 92 and 90 represent a modified Accumulator, i.e., FIG. 16, and it is mounted on a trailer chassis.

Figure 19:
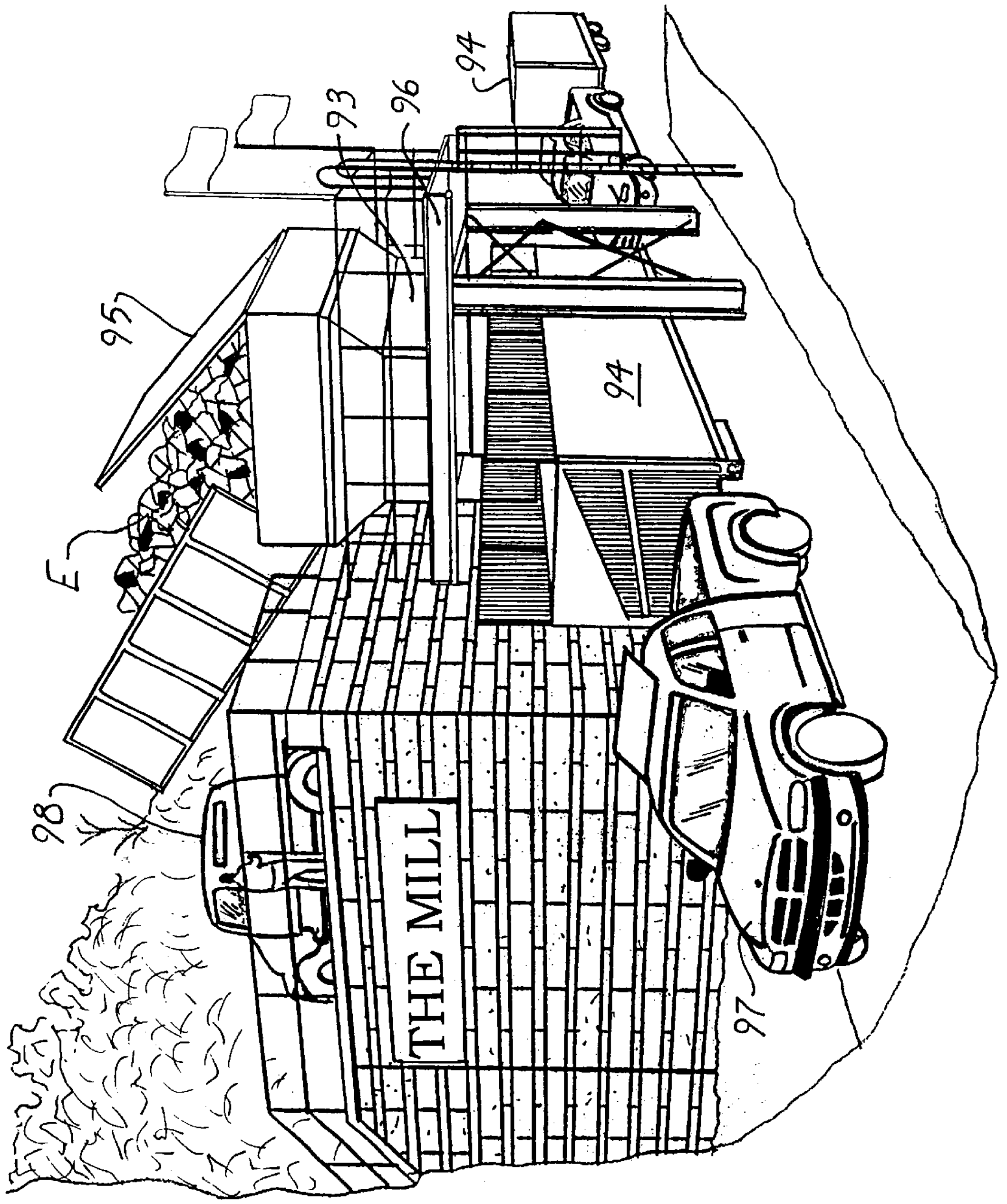

FIG. 19 reveals another usage of the Mutilator; 93, 94 and 97 represent yet another type of towing vehicle; 95 loading hopper; 96 represents the framing structure; 98 represents the refuse collection vehicle; and E represents the bulk refuse.

Figure 20:
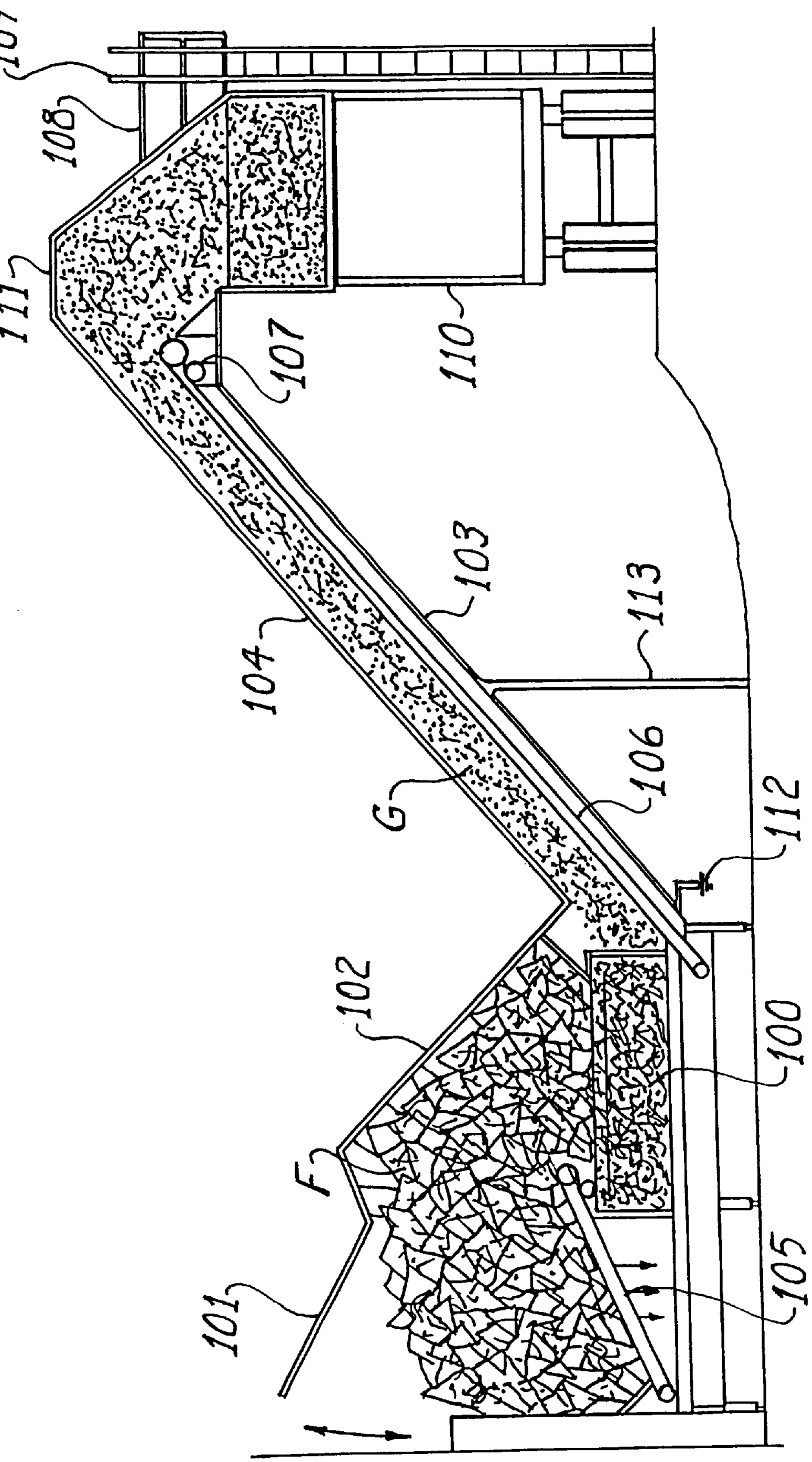

FIG. 20 reveals a further usage of the Mutilator 100; 101 represents the hopper collection enclosure; "F" represents the bulk refuse awaiting to be processed; 102 reveals the cover of the hopper 101; 103 represents framing enclosure; 104 is the cover for the conveyer enclosure; 105 represents the feed conveyor; 06 is the inclined conveyor, conveying processed materials "G"; 107 is the drive mechanism; 108 is service platform; 109 is ladder for the service platform; 108, 110 is the mode of vehicle trailer used for accumulation of the processed refuse and when dispatched to the landfill it will automatically discharge its contents; 111 is the hood cover for servicing the inclined conveyor; 112 is the residual liquid drain; 113 are leg supports for the conveyor structure.

Although this invention has been fully described with respect to its seven embodiments, many other variations will become apparent. It is therefore the intention that these appended claims be interpreted as broadly as it is possible in view of the prior art to include variations and modifications.

What is claimed is:

1. A refuse collection and disposal handling system comprising:

- a front loading means for the servicing of bulk refuse which is disposed in front loading and associated refuse containers;
- a refuse collection and gathering cubicle enclosure mounted to a companion vehicle's chassis;
- a mutilator device means which is disposed in said collection and gathering enclosure cubicle, the said mutilator is arranged to give the said collected bulk refuse a treatment which in turn converts the said bulk refuse into many tiny bits, chips and sawdust;
- a said mutilator device means which is comprised of a plurality of high speed traveling gang saws, which are parallel disposed, configured to receive said bulk refuse and upon demand automatically decompose the said bulk mixed refuse converts into many tiny bits and chips;
- a wind generating means which provides both pushing and pulling high velocity strong wind currents, the said strong wind currents will pick up said refuse tiny bits and saw dust, creating a stream of debris that is directed into a companion vehicle for accumulation;
- an accumulator means, which is comprised of an enclosure cubicle mounted on a trailer means, being able to accumulate the said refuse tiny bits and chips;
- a platen device means that is disclosed within the said accumulator means, is positioned automatically to help bunch the incoming said refuse tiny bits and chips;
- a platen device means which is further configured to be automatically positioned along a companion track system means, which is disposed internally arranged in said accumulator means;
- a platen devices means which is arranged to mount an array of said high velocity wind generator means;
- a said accumulator means which is arranged to automatically discharge the said processed refuse.

2. A refuse collection and disposal handling system as in claim 1 wherein the said front-loading means is made a part of the companion vehicle.

3. A refuse collection and disposal handling system as in claim 1 wherein the said collection gathering enclosure cubicle is made part of the companion vehicle.

4. A refuse collection and disposal handling system as in claim 3 wherein said collection gathering enclosure cubicle is arranged with removable outside panels.

5. A refuse collection and disposal handling system as in claims 1 wherein said collection gathering enclosure cubicle is arranged internally with a mutilating device means.

6. A refuse collection and disposal handling system as in claim 1 wherein the mutilating device means is made part of the collection gathering enclosure cubicle.

7. A refuse collection and disposal handling system as in claim 1, wherein said mutilator device means comprises of a plurality of high speed traveling chain saws which are parallel disposed.

8. A refuse collection and disposal handling system as in claim 1, wherein the said mutilator device means comprises of a plurality of said high speed traveling chain saws which are arranged with a variety of cutting teeth that are uniquely arranged and made part of the said high speed traveling saw chain.

9. A refuse collection and disposal handling system as in claim 8 wherein said high speed traveling saw chain is arranged with cutting teeth, the cutting teeth are configured into a "V" contour which, when mounted on the parent chain, are disposed to form a "W" cutting path, i.e., on the chain one "V" contoured tooth is displayed outwards, the next is displayed inward, while the next is displayed inwards, and the next is further displayed outwards, hence an appearance of a "W" after all the teeth have been mounted and displayed.

10. A refuse collection and disposal handling system as in claim 9 wherein the said cutting teeth are arranged to give cutting edges on the inside and outside, thereby creating a stream of residue in the form of a variety of tiny bits, chips and dust.

11. A refuse collecting and disposal system as in claim 1 wherein said accumulator trailer means is arranged to receive all the said processed refuse in the form of many tiny bits, chips, sawdust that are being carried in a said high velocity wind stream, said wind stream is being generated by a plurality of high velocity wind blowers.

12. A refuse collection and disposal handling system as in claim 1 wherein said accumulator device means is arranged with a platen device means, which is movable to and fro, with automatically arranged track system that will further mechanically position the said platen device at several prearranged locations, a necessary condition; which will assist in the accumulation of the said processed refuse bits and dust.

13. A refuse collection and disposal handling system as in claim 11, wherein said moveable platen device means is further arranged with a plurality of high velocity wind blowers which are reversible and are both able to generate winds that push and pull.

14. A refuse collection and disposal handling system as in claim 1 wherein said mutilator and accumulator means are arranged in a single working mode for front-loading bulk refuse handling services.

15. A refuse collection and disposal handling system as in claim 1 wherein said mutilator and accumulator means are arranged in a single vehicle working mode, for rear loading refuse handling services.

16. A refuse collection and disposal handling system as in claim 1 wherein vehicle working mode is further arranged with a rear loading bulk refuse hopper that is also automatically unloaded.

17. A refuse collection and handling system as in claim 1 wherein said mutilator and accumulator are arranged in a single chassis working mode for side loading bulk refuse handling services.

18. A refuse collection and handling system as in claim 1 wherein said mutilator and accumulator are arranged in a single trailer mode, having a companion towing vehicle, which is further arranged with a dumper means and side guards for the loading of discarded appliances, which normally are too large for the loading rear hopper.

19. A refuse collection and disposal handling system as in claim 1 wherein said mutilator and accumulator are disposed separately in order to provide services associated with a refuse transferring station and shopping centers' refuse handling arrangements which allows the bulk mixed refuse to be processed into the said bits and chips and further allowing for the automatically loading of the companion accumulating trailer means.

20. A refuse collection and disposal handling system as in claim 1 wherein said mutilator and accumulator are separately disposed in order to provide services associated with land clearing operations arrangement which will allow the bulk mixed refuse to be automatically processed into said bits and chips, further allowing said bits and chips to be automatically loaded into a companion accumulator trailer means.

* * * * *